(12) United States Patent
Neuvirth et al.

(10) Patent No.: US 11,038,913 B2
(45) Date of Patent: Jun. 15, 2021

(54) PROVIDING CONTEXT ASSOCIATED WITH A POTENTIAL SECURITY ISSUE FOR AN ANALYST

(71) Applicant: Microsoft Technology Licensing, LLC, Redmond, WA (US)

(72) Inventors: Hani Hana Neuvirth, Redmond, WA (US); Sangeetha Madderla, Redmond, WA (US); Larry J. Matuska, Redmond, WA (US); William K. Hollis, Duvall, WA (US); Gueorgui Chkodrov, Redmond, WA (US); Yotam Livny, Gadera (IS)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 16/389,478

(22) Filed: Apr. 19, 2019

(65) Prior Publication Data
US 2020/0336505 A1    Oct. 22, 2020

(51) Int. Cl.
*H04L 29/06* (2006.01)
*G06N 20/00* (2019.01)
(Continued)

(52) U.S. Cl.
CPC ........ *H04L 63/1433* (2013.01); *G06F 40/295* (2020.01); *G06K 9/6263* (2013.01);
(Continued)

(58) Field of Classification Search
CPC ............. H04L 63/1416; H04L 63/1425; H04L 63/1433; H04L 63/20; H04L 41/0631;
(Continued)

(56) References Cited

U.S. PATENT DOCUMENTS 10,848,510 B2 * 11/2020 Chauhan ............... G06F 16/951
2007/0028297 A1 * 2/2007 Troyansky .......... H04L 63/1425
726/2
(Continued)

OTHER PUBLICATIONS

"International Search Report and Written Opinion Issued in PCT Application No. PCT/US20/023033", dated May 27, 2020, 16 Pages.

*Primary Examiner* — Thaddeus J Plecha
(74) *Attorney, Agent, or Firm* — Newport IP, LLC; Jacob P. Rohwer (57) ABSTRACT

Disclosed herein is a system for generating and displaying information useful to help a security analyst understand a scale and a root cause of a potential security issue associated with a resource. The resource can include a server, a storage device, a user device (e.g., a personal computer, a tablet computer, a smartphone, etc.), a virtual machine, networking equipment, etc. The resource may be one that is under control of an entity operating a security operations center. Additionally or alternatively, the resource may be one that is configured to be monitored by the security operations center. The information provides the security analyst with a broader context of the potential security issue based on relationships between the potential security issues and other security issues. Consequently, the information enables the security analyst to implement more efficient and effective actions to handle the potential security issue.

18 Claims, 7 Drawing Sheets

ANALYST GUI 300

| CASE NO. | DESCRIPTION | MITIGATION RATE | TP RATE | SEVERITY LEVEL |
|---|---|---|---|---|
| 546137 | LOGIN EVENT: SUSPICIOUS ACTIVITY | 74% | 55% | 5 |
| 546148 | 4534 INVALID ACCESS DETECTED | 56% | 95% | 2 |
| 546124 | 3544 UNKNOWN POWERSHELL ACTIVITY | 45% | 35% | 2 |
| 546144 | SMASH ATTACK COMPROMISE | 22% | 12% | 1 |

(51) Int. Cl.
*G06F 40/295* (2020.01)
*G06K 9/62* (2006.01)
*H04L 12/24* (2006.01)

(52) U.S. Cl.
CPC ......... *G06N 20/00* (2019.01); *H04L 41/0631* (2013.01); *H04L 63/1416* (2013.01); *H04L 63/1425* (2013.01); *H04L 41/22* (2013.01); *H04L 63/20* (2013.01)

(58) Field of Classification Search
CPC ....... H04L 41/22; G06N 20/00; G06F 40/295; G06K 9/6263
See application file for complete search history.

(56) References Cited

U.S. PATENT DOCUMENTS

| | | | |
|---|---|---|---|
| 2007/0266138 A1* | 11/2007 | Spire | H04L 63/1416 709/223 |
| 2008/0016569 A1* | 1/2008 | Hammer | G06F 21/554 726/23 |
| 2014/0259170 A1* | 9/2014 | Amsler | H04L 63/20 726/23 |
| 2016/0044061 A1* | 2/2016 | Forte | G06F 3/04817 715/713 |
| 2016/0226905 A1 | 8/2016 | Baikalov et al. | |
| 2017/0093902 A1* | 3/2017 | Roundy | H04L 63/1416 |
| 2018/0137401 A1 | 5/2018 | Kumar et al. | |
| 2018/0219875 A1 | 8/2018 | Bania et al. | |
| 2018/0365417 A1* | 12/2018 | Wu | G06N 20/00 |
| 2018/0367561 A1* | 12/2018 | Givental | H04L 63/1408 |
| 2019/0081871 A1* | 3/2019 | Nazar | H04L 43/0823 |
| 2019/0268354 A1* | 8/2019 | Zettel, II | H04L 63/1416 |
| 2020/0067985 A1* | 2/2020 | Bhargava | G06F 3/0481 |
| 2020/0110882 A1* | 4/2020 | Ripolles Mateu | G06F 16/3347 |
| 2020/0134188 A1* | 4/2020 | Bagheri | G06N 3/08 |

* cited by examiner

| | ANALYST GUI 300 | | | |
|---|---|---|---|---|
| CASE NO. | DESCRIPTION | MITIGATION RATE | TP RATE | SEVERITY LEVEL |
| 546137 | LOGIN EVENT: SUSPICIOUS ACTIVITY | 74% | 55% | 5 |
| 546148 | 4534 INVALID ACCESS DETECTED | 56% | 95% | 2 |
| 546124 | 3544 UNKNOWN POWERSHELL ACTIVITY | 45% | 35% | 2 |
| 546144 | SMASH ATTACK COMPROMISE | 22% | 12% | 1 |

FIG. 3

ANALYST GUI 400

| GROUP | CASE NO. | DESCRIPTION | FEEDBACK |
|---|---|---|---|
| 231 | | | |
| XYZ DOMAIN | 546137 | LOGIN EVENT: SUSPICIOUS ACTIVITY | |
| | 546238 | LOGIN: POTENTIAL COMPROMISE | |
| | 546179 | LOGIN EVENT: SUSPICIOUS ACTIVITY | |
| | 546205 | UNAUTHORIZED LOGIN: SECURITY THREAT | |

```
┌─────────────────────────────────────────────────────────────────┐
│ RECEIVE A NEW CASE ASSOCIATED WITH A POTENTIAL SECURITY ISSUE TO A RESOURCE │
│                              602                                │
└─────────────────────────────────────────────────────────────────┘
                                  ↓
┌─────────────────────────────────────────────────────────────────┐
│ EXTRACT FEATURES FROM THE NEW CASE, WHEREIN THE FEATURES COMPRISE WORDS │
│ USED IN THE DESCRIPTION OF THE POTENTIAL SECURITY ISSUE AND A DOMAIN TO WHICH │
│                    THE RESOURCE BELONGS                         │
│                              604                                │
└─────────────────────────────────────────────────────────────────┘
                                  ↓
┌─────────────────────────────────────────────────────────────────┐
│ APPLY A MODEL TO THE FEATURES TO IDENTIFY CASES THAT HAVE CORRESPONDING │
│ DESCRIPTIONS SIMILAR TO THE DESCRIPTION OF THE POTENTIAL SECURITY ISSUE, │
│ WHEREIN THE CASES ARE WAITING TO BE ANALYZED BY SECURITY ANALYSTS │
│                              606                                │
└─────────────────────────────────────────────────────────────────┘
                                  ↓
┌─────────────────────────────────────────────────────────────────┐
│ REDUCE THE NUMBER OF CASES BASED ON A MATCHING DOMAIN TO PRODUCE A GROUP │
│                          OF CASES                               │
│                              608                                │
└─────────────────────────────────────────────────────────────────┘
                                  ↓
┌─────────────────────────────────────────────────────────────────┐
│ PRESENT THE GROUP OF CASES FOR ANALYSIS IN A GRAPHICAL USER INTERFACE │
│                              610                                │
└─────────────────────────────────────────────────────────────────┘
                                  ↓
┌─────────────────────────────────────────────────────────────────┐
│ RECEIVE FEEDBACK WITH REGARD TO WHETHER AN INDIVIDUAL CASE IS CORRECTLY │
│                     INCLUDED IN THE GROUP                       │
│                              612                                │
└─────────────────────────────────────────────────────────────────┘
```

FIG. 6

PROVIDING CONTEXT ASSOCIATED WITH A POTENTIAL SECURITY ISSUE FOR AN ANALYST

BACKGROUND

Security is an important aspect for platforms that offer network services. As cloud computing gains popularity, more and more sensitive data and/or services are stored and provided online. Consequently, computer security has become more crucial than ever before. Network providers are especially interested in keeping resources safe to help protect their clients' assets and to avoid legal liability.

In many scenarios, an entity that operates a cloud-based platform uses a security operations center to review potential security issues associated with resources. The resource may be one that the entity controls and/or one that the entity has the responsibility to monitor. The security operations center includes security analysts that investigate the potential security issues in order to determine whether mitigation actions need to be taken to resolve the potential security issues. More specifically, a potential security issue may or may not be a real problem that needs to be mitigated. Consequently, conventional security systems that support the security operations center are configured to pass a potential security issue on to a desk of a security analyst so the security analyst can determine whether the potential security issue is a real problem that needs to be mitigated.

However, these conventional security systems do not effectively determine and provide context, for security analysts, into relationships between security issues. The context of relationships between potential security issues may be useful in helping a security analyst determine whether the potential security issue is a real problem that needs to be mitigated. It is with respect to these and other considerations that the disclosure made herein is presented.

SUMMARY

The techniques disclosed herein enable systems to generate and display information useful to help a security analyst understand a scale and a root cause of a potential security issue associated with a resource. The resource can include a server, a storage device, a user device (e.g., a personal computer, a tablet computer, a smartphone, etc.), a virtual machine, networking equipment, etc. The resource may be one that is under control of an entity operating a security operations center. Additionally or alternatively, the resource may be one that is configured to be monitored by the security operations center. The information provides the security analyst with a broader context of the potential security issue based on relationships between the potential security issues and other security issues. Consequently, the information enables the security analyst to implement more efficient and effective actions to handle the potential security issue.

As described herein, a potential security issue that is passed on to a security analyst and that is to be analyzed by the security analyst may be referred to as a "case". A case can be generated based on one or more detected alerts. When detected alerts result in a case, it means that there is a situation where one or more resources may be susceptible or exposed to a problem, and therefore, further investigation by the security analyst is warranted. To add a little context, roughly seventy to eighty percent of cases that are analyzed by security analysts in security operations centers are not real security issues that need to be mitigated. A real security issue that needs to be mitigated may be referred to herein as an incident (e.g., a cyberattack). An incident, for example, can be related to distributed denial of service (DDoS) attacks, the installation of malware on a resource, a brute force attack, phishing campaigns, etc.

In embodiments described herein, given a new case (e.g., a query case), the techniques are configured to identify similar cases that have previously been analyzed by security analysts so that information associated with the similar cases can be displayed to a security analyst tasked with analyzing the new case. In this way, the security analyst tasked with analyzing the new case can gain a better understanding of the context of the new case. For example, the information can describe successful and/or unsuccessful actions that were taken to mitigate a case, and thus, the information can be used to guide the security analyst to an optimal way to mitigate a potential security issue. In another example, the information can reflect a severity level of the potential security issue, and thus, can help the security analyst prioritize which cases to handle first. That is, a case waiting to be analyzed that is similar to previously analyzed cases with a higher severity level may be prioritized for mitigation over another case waiting to be analyzed that is similar to previously analyzed cases with a lower severity level.

In further embodiments described herein, given a new case, the techniques are configured to identify similar cases that are waiting to be analyzed by a security analyst. The techniques can then combine the new case with the similar cases so they can be displayed to a security analyst as a group for more efficient analysis. For instance, the techniques described herein can group one hundred similar cases together so a single security analyst can mitigate one of the one hundred similar cases and then efficiently repeat the same mitigation actions on the other ninety-nine similar cases.

A case can include a description (e.g., title, name, etc.) of the potential security issue and an identification of a resource that may be susceptible or exposed to the potential security issue. Generally, a case description includes about three to thirty words, or about one to three sentences. Cases may be generated manually or automatically by different systems and/or by different people. For example, cases can be generated automatically by alert monitoring systems, such as an anti-malware software, or other detection mechanisms configured by different organizations of a cloud-based platform. In another example, cases can be generated from external customer reports submitted through a customer portal configured within the cloud-based platform. In yet another example, cases can be generated by security analysts themselves. Due to the widespread nature in which cases can be generated, cases that are associated with the same potential security issue often have different descriptions.

To identify cases that are similar to a new case, the system described herein learns a model and applies the model to features extracted from information associated with the new case. In various embodiments, the extracted features can include words used in the description. The model can be trained to map the words used in the description to a linguistic context. For instance, this model (e.g., a "doc2vec" model) may use neural networks to produce word embeddings and to construct the linguistic contexts of the words used in the description. The model can be configured to extract and take in features (e.g., words used in descriptions) associated with a large number (e.g., hundreds, thousands, millions, etc.) of cases, in a training data set, and use natural language processing techniques to produce a vector space that includes a vector representation for the words used in an individual description. The vector representations are positioned, in the vector space, so that descriptions that are more likely to share common linguistic contexts are located in close proximity to one another. Consequently, the model is configured to map different descriptions to the same linguistic context in order to determine similar cases.

In various examples described herein, the system can use another model, such as a k-nearest neighbor algorithm (e.g., k=5), to determine a percentage of some or all of the similar cases that are actual, real security issues that needed to be mitigated by a security analyst. This percentage can be used to indicate a probability that the new case is also an actual, real security issue that needs to be mitigated by the security analyst. This probability may be referred to as a true positive rate. The true positive rate may be displayed in a graphical user interface as part of the information that is useable to help the security analyst gain a better understanding of the context of a new case.

Additionally, the system can determine and display a mitigation rate. The mitigation rate comprises a percentage of the similar cases that needed mitigation, or that could not be dismissed or ignored by a security analyst as a non-issue. The mitigation rate provides an indication of whether a case is likely to require resolution actions by the security analyst. Accordingly, the information displayed to a security analyst via a graphical user interface provides added value with respect to understanding the context of the new case based on previously analyzed cases and helps the security analyst determine if the new case needs a deeper investigation and/or if the new case likely needs to be mitigated.

In further examples described herein, the system can extract additional features from information associated with a case. For instance, a case may identify a resource that is likely to be affected by the potential security issue and/or a domain to which the resource belongs. A domain can define any type of division of resources that are being monitored by the security operations center. For example, a domain can comprise a particular group of machines, a particular network, a particular service, a particular platform or sub-platform, a particular organization, etc. The system can use the extracted features to determine that a domain to which the new case belongs (e.g., a domain in which the potential security issue occurs or is likely to occur) is a same domain to which one or more other cases belong. In one example, the system can use this condition to determine similarity and to group the new case with the one or more cases. By grouping similar cases together based on domain information and passing a group of similar cases to a single security analyst for evaluation, the techniques described herein reduce the total amount of cases that need to be analyzed by security analysts. In another example, the system can use the domain related features to limit cases determined to be similar based on descriptions, so a more accurate true positive and/or mitigation rate can be calculated.

In various examples, the graphical user interface output by the system for the security analyst is configured to present an option for the security analyst to provide feedback indicating whether an individual case is similar to other cases it is grouped with. For example, upon a cursory review of the displayed information and/or a deeper investigation, a security analyst can provide an indication that the system correctly grouped the case with the other cases or that the system incorrectly grouped the case with the other case. Acquiring this feedback enables a supervised learning approach that can improve the model using labels that continue to be collected over time.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for generating and displaying information useful to help a security analyst understand a scale and a root cause of a potential security issue associated with a resource. The resource can include a server, a storage device, a user device (e.g., a personal computer, a tablet computer, a smartphone, etc.), a virtual machine, networking equipment, etc. The resource may be one that is under control of an entity operating a security operations center. Additionally or alternatively, the resource may be one that is configured to be monitored by the security operations center. The information provides the security analyst with a broader context of the potential security issue based on relationships between the potential security issues and other security issues. Consequently, the information enables the security analyst to implement more efficient and effective actions to handle the potential security issue.

Various examples, scenarios, and aspects of the disclosed techniques are described below with reference to FIGS. 1-7.

Figure 1:
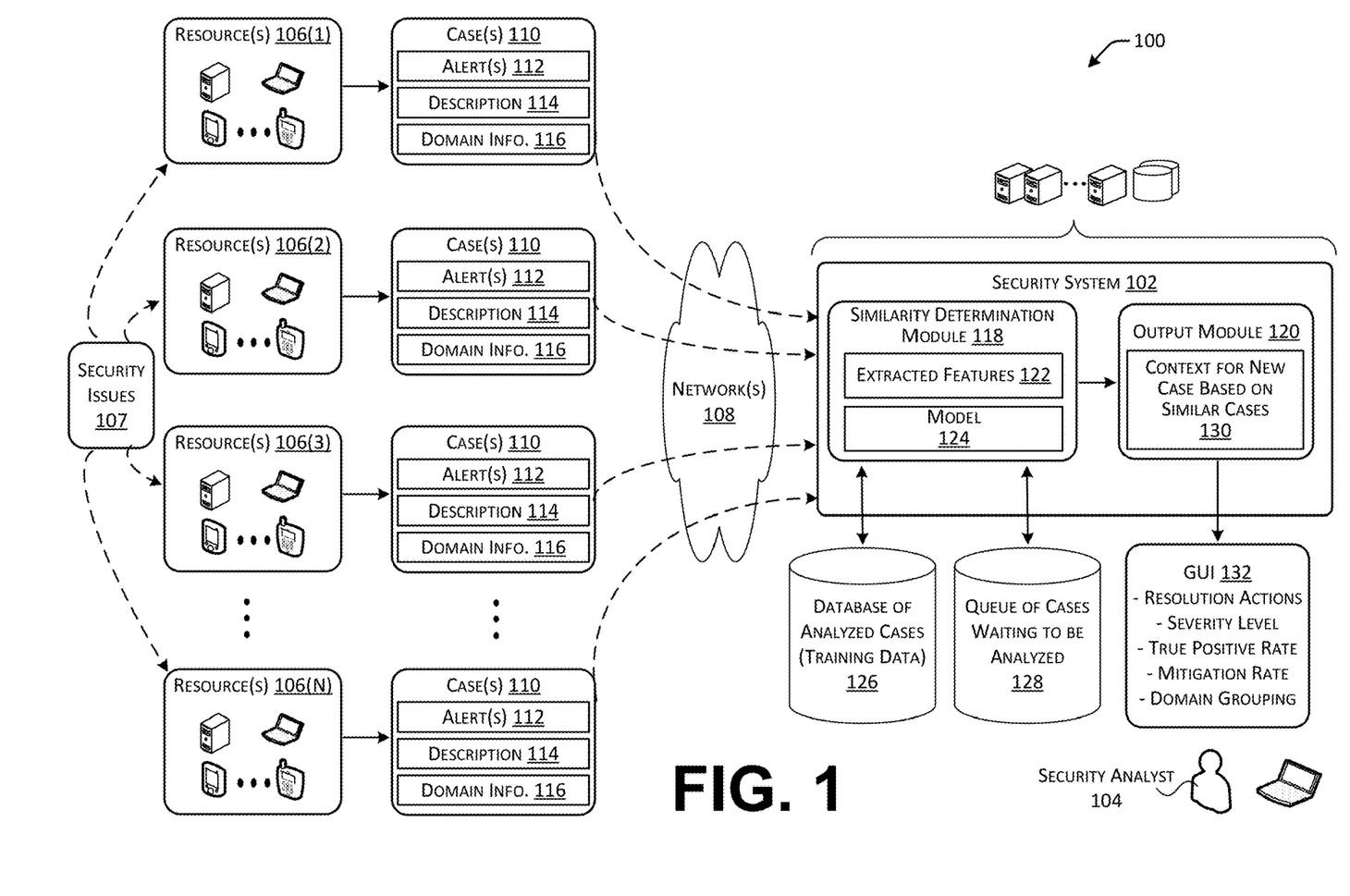
FIG. 1 is a diagram illustrating an example environment in which a security system, supporting a security operations center, is configured to identify cases that are similar to a new case (e.g., a query case).

FIG. 1 is a diagram illustrating an example environment 100 in which a security system 102, supporting a security operations center, is configured to identify cases that are similar to a new case (e.g., a query case). The security system 102 is configured to display information and/or group similar cases so that a security analyst 104 can implement more efficient and effective actions to handle a potential security issue.

FIG. 1 illustrates various resources 106(1)-106(N) (may be referred to herein as resources 106) that may experience potential security issues 107. In the context of FIG. 1, N is a positive integer number such as four, five, ten, fifty, etc. that represents different domains to which the resources 106 can belong. A domain can define any type of division of resources that are being monitored by the security system 102 via network(s) 108. For example, a domain can comprise a particular group of machines, a particular network, a particular service, a particular platform or sub-platform, a particular organization, etc. In some instances, a resource can be part of multiple different domains.

As described above, a resource can include a server, a storage device, a user device (e.g., a personal computer, a tablet computer, a smartphone, etc.), a virtual machine, networking equipment, and so forth, that is under control of an entity operating the security system 102. Additionally or alternatively, a resource may be one that is configured to be monitored by the security system 102. Detection mechanisms (e.g., monitoring software) can be used by the security system 102 to generate cases 110 to be analyzed by a security analyst 104. A case 110 can be generated based on one or more detected alerts 112. When detected alerts 112 result in a case 110, it means that there is a situation where one or more resources 106 may be susceptible or exposed to a potential security issue 107, and therefore, further investigation by a security analyst 104 is warranted.

In one example, a security issue 107 can be associated with a cyberattack that attempts to gain access to resources 106 by "cracking" user passwords. An attacker can run programs on its own device to use different methods to access accounts. For instance, the attacker can use brute force attacks to guess the passwords or compare various word combinations against a dictionary file to obtain the passwords. After gaining access to the resources 106, the attacker can perform various malicious actions on the resource 106. In another example, a security issue 107 can be associated with a cyberattack that installs malware or other types of malicious software on the resources 106 to instruct the resources 106 to communicate with and execute commands from a network server under the control of an attacker. The compromised resources 106 can cause further damage to uncompromised resources 106 such as collecting sensitive information or distributing spam.

Each case 110 includes a description 114 (e.g., title, name, etc.) of the potential security issue 107. Moreover, a case 110 may include domain information 116. The domain information 116 can be determined based on an identification of a resource 106 that may be susceptible or exposed to the potential security issue 107. As described above, a case 110 may be generated manually or automatically by different systems and/or by different people based on system detected alerts or human observation. For example, a case 110 can be generated automatically by alert monitoring systems, such as an anti-malware software. In another example, a case 110 can be generated from external customer reports submitted through a customer portal of a network service provider. In yet another example, a case 110 can be generated by a security analyst 104.

Consequently, cases 110 that are associated with the same potential security issue 107 often have different descriptions. In a more specific example, two different detection authors may manually write two different descriptions for the same potential security issue 107 occurring on resources in two different domains. Or, different alert detection mechanisms may automatically generate descriptions for the same potential security issue 107 using structured text based on the same type of alert that is defined differently within different domains.

The security system 102 is configured to receive the cases 110 and/or generate its own cases for analysis by a team of security analysts. The security system 102 can comprise device(s) (e.g., servers, client devices, etc.) and/or other components that communicate with one another with and/or with the resources 106 via network(s) 108. Moreover, the security system 102 can include a similarity determination module 118 and an output module 120. The similarity determination module 118 is configured to extract features 122 (e.g., words, a domain, etc.) from information associated with a new case 110 and apply a model 124 to the extracted features 122 to identify similar cases, examples of which are described herein with respect to FIG. 2.

The number of illustrated modules is just an example, and the number can vary higher or lower. That is, functionality described herein in association with the illustrated modules can be performed by a fewer number of modules or a larger number of modules on one device or spread across multiple devices.

In various embodiments, the identified similar cases are ones that have previously been analyzed by security analysts, which are stored in a database of analyzed cases 126. Accordingly, the similarity determination module 118 can access the database of analyzed cases to determine that a new case is similar to one or more previously analyzed cases. In further embodiments, the identified similar cases are ones waiting to be analyzed by security analysts, which are stored in a queue of cases waiting to be analyzed 128. Accordingly, the similarity determination module 118 can access the queue of cases waiting to be analyzed 128 to determine that a new case is similar to one or more cases waiting to be analyzed.

Once the similar cases are identified, the output module 120 can access and/or determine information that captures a context 130 for the new case based on the similar cases. The output module 120 can then cause the information to be displayed via a graphical user interface 132 of a device being used by the security analyst 104. In one example, the information describes resolution actions that were taken to mitigate previously analyzed cases, and thus, the information can be used to guide the security analyst 104 to an optimal way to mitigate a potential security issue. In another example, the information can include a severity level of the potential security issue, and thus, the information can help the security analyst 104 prioritize which cases to handle first. In yet another example, the information can include a true positive rate which is a percentage of the similar cases previously analyzed that actually amounted to an actual, real security issue. In a further example, the information can include a mitigation rate which is a percentage of the similar cases previously analyzed that needed mitigation, or that could not be dismissed or ignored by a security analyst 104 as a non-issue. The mitigation rate provides an indication of whether a case is likely to require resolution actions by the security analyst 104.

Consequently, the information displayed to the security analyst 104 via the graphical user interface 132 provides added value with respect to understanding the context 130 of the new case in light of similar cases that have been previously analyzed. This can help the security analyst 104 determine if the new case needs a deeper investigation and/or if the new case needs to be mitigated.

In additional embodiments, the information displayed to a security analyst 104 can include a domain grouping so the security analyst 104 can better understand the scale of the potential security issue with respect to a particular domain. For instance, the similarity determination module 118 can combine a new case with similar cases waiting to be analyzed so they can be displayed to a security analyst as a group for more efficient analysis. In this scenario, similar cases can be identified based on similar descriptions and matching domains (e.g., the resources belong to a same domain). In this way, the techniques described herein can group a large number (e.g., five hundred) of similar cases together so a single security analyst 104 can mitigate or dismiss the cases as a group.

In various examples, device(s) of a security system 102 can include one or more computing devices that operate in a cluster or other grouped configuration to share resources, balance load, increase performance, provide fail-over support or redundancy, or for other purposes. For instance, device(s) of a security system 102 can belong to a variety of classes of devices such as server-type devices, desktop computer-type devices, mobile-type devices, special purpose-type devices, embedded-type devices, and/or wearable-type devices. A client device used by a security analyst 104 can include, but is not limited to, a desktop computer, a game console and/or a gaming device, a tablet computer, a personal data assistant (PDA), a mobile phone/tablet hybrid, a laptop computer, a telecommunication device, a wearable device, a work station, or any other sort of computing device.

A client device can include input/output (I/O) interfaces that enable communications with input/output devices such as user input devices including peripheral input devices (e.g., a keyboard, a mouse, a pen, a voice input device, a touch input device, a gestural input device, and the like) and/or output devices including peripheral output devices (e.g., a display, a printer, audio speakers, a haptic output device, and the like). A client device can also include one or more network interface(s) to enable communications between device(s) over network(s) 108. Such network interface(s) can include one or more network interface controllers (NICs) or other types of transceiver devices to send and receive communications and/or data over a network.

Network(s) 108 can include, for example, public networks such as the Internet, private networks such as an institutional and/or personal intranet, or some combination of private and public networks. Network(s) 108 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 108 can utilize communications protocols, including packet-based and/or datagram-based protocols such as internet protocol (IP), transmission control protocol (TCP), user datagram protocol (UDP), or other types of protocols. Moreover, network(s) 108 can also include a number of devices that facilitate network communications and/or form a hardware basis for the networks, such as switches, routers, gateways, access points, firewalls, base stations, repeaters, backbone devices, and the like.

Figure 2:
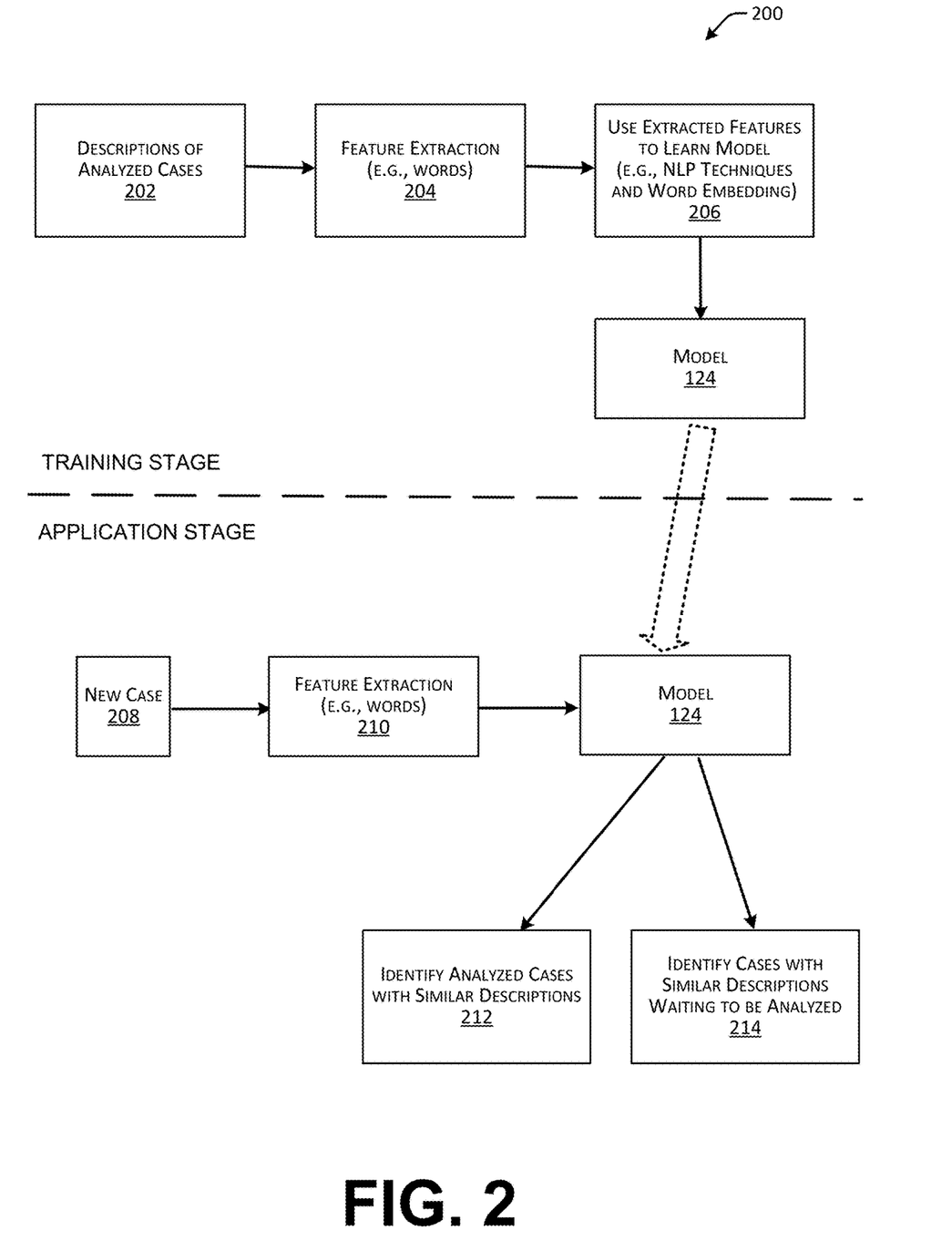
FIG. 2 is a block diagram illustrating a training stage and an application stage for a model used to determine that cases are similar provided features that reflect case descriptions.

FIG. 2 is a block diagram 200 illustrating a training stage and an application stage for a model used to determine that cases are similar provided features that reflect case descriptions. As described above, the similarity determination module 118 is configured to identify cases that are similar to a new case by applying a model 124 to features extracted from information associated with the new case.

During the training stage, the model 124 can be learned by using, as a training data set, descriptions 202 of cases that have already been analyzed (e.g., cases stored in the database 126). The similarity determination module 118 performs feature extraction 204 on the descriptions and uses the extracted features to learn the model 124 via natural language processing techniques and word embedding 206.

The model 124 is trained to map the words used in a description to a linguistic context. This model 124 (e.g., a "doc2vec" model) may use neural networks to produce word embeddings and to construct the linguistic contexts of the words used in the description. The model 124 can produce a vector space that includes a vector representation for the words used in an individual description. The vector representations are positioned, in the vector space, so that descriptions that are more likely to share common linguistic contexts are located in close proximity to one another. Consequently, the model is configured to map different descriptions to the same linguistic context and to determine cases that are similar based on descriptions.

After the training stage is complete, the model 124 can be used in the application stage to perform the task of determining similar cases. That is, provided a new case 208, the similarity determination module 118 implements feature extraction 210 on the new case 208 and applies the model 124 in order to generate a vector representation for the words used in the description and to insert the vector representation into the vector space. Accordingly, the model 124 can identify already analyzed cases with similar descriptions 212. Moreover, the model 124 can identify cases with similar descriptions waiting to be analyzed 214.

In various examples, the output module 120 can use another model, such as a k-nearest neighbor algorithm (e.g., k=5), to determine a percentage of some or all of the similar cases that are actual, real security issues that needed to be mitigated by a security analyst. This percentage can be used to indicate a probability that the new case is also an actual, real security issue that needs to be mitigated. This probability may be referred to as a true positive rate.

Figure 3:
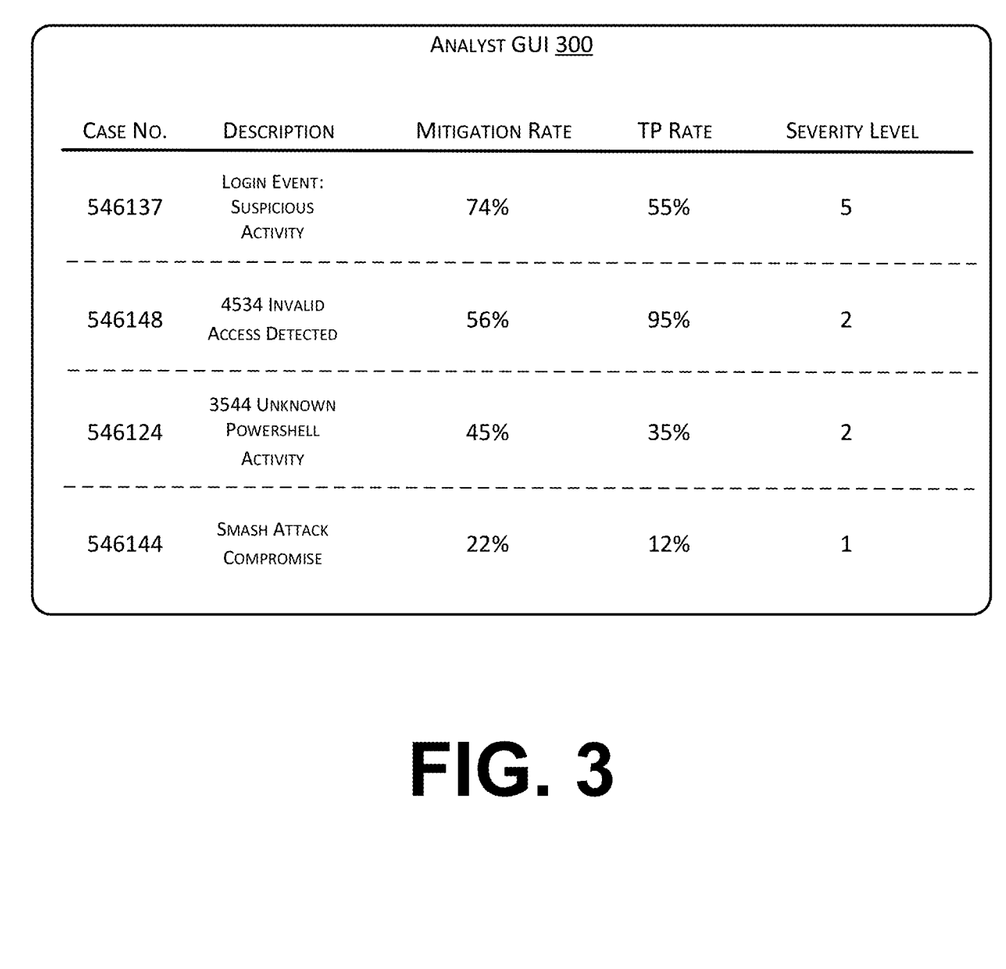
FIG. 3 is an example graphical user interface illustrating information that can be displayed to a security analyst to provide context for a new case. The information is determined based on previously analyzed cases that are determined to be similar to the new case.

As shown in the example graphical user interface 300 of FIG. 3, the true positive rates (e.g., "TP Rate") can be displayed as part of the information that is useable to help a security analyst gain a better understanding of the context of a new case. For instance, FIG. 3 shows four new cases with different case numbers and descriptions that have been used to identify similar cases for each of the new cases. The graphical user interface in FIG. 3 further illustrates a mitigation rate, which is a percentage of the similar cases that needed mitigation. The mitigation rate provides an indication of whether a case is likely to require resolution actions by the security analyst. FIG. 3 further illustrates a severity level for each new case waiting to be analyzed. The severity level can be determined based on severity information associated with the similar cases. Moreover, the new cases waiting to be analyzed can be displayed in a prioritized order based on the severity levels.

Figure 4:
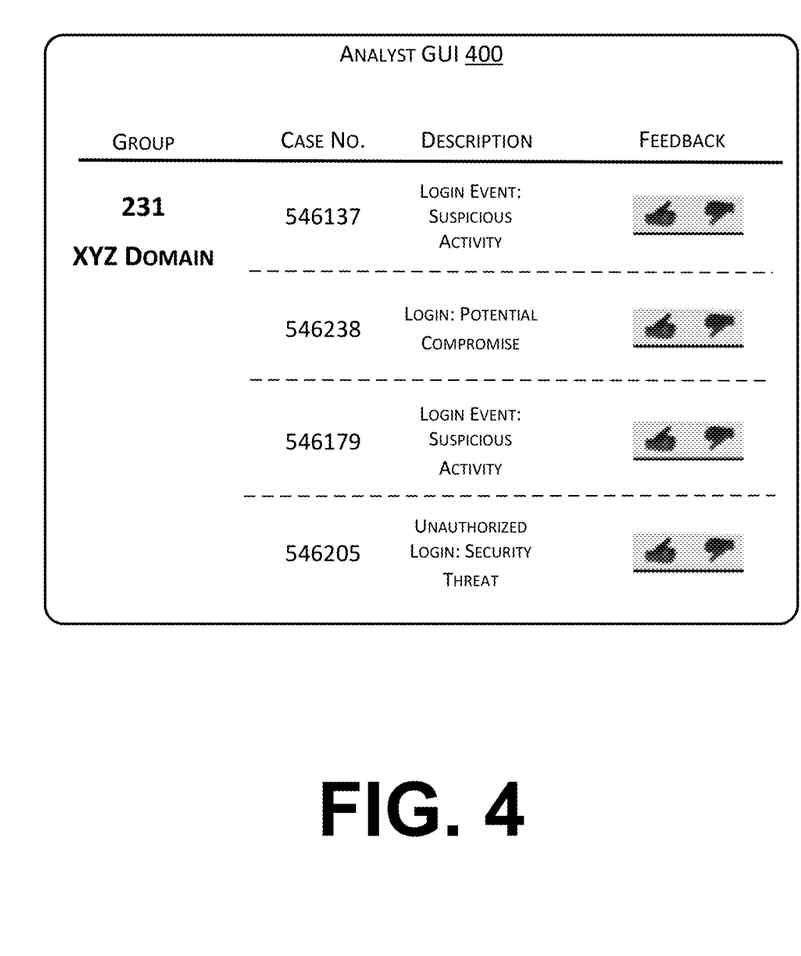
FIG. 4 is another example graphical user interface illustrating information that can be displayed to a security analyst to provide context for a new case. The information is determined based on cases that are waiting to be analyzed and that are determined to be similar to the new case.

FIG. 4 is another example graphical user interface 400 illustrating information that can be displayed to a security analyst to provide context for a new case. The information is determined based on cases that are waiting to be analyzed and that are determined to be similar to the new case. In this example, cases that are queued and waiting to be analyzed are grouped based on similar descriptions (as shown in FIG. 4). Further, the cases can be grouped based on domain information. That is, before displaying a group of cases to a security analyst, the output module 120 can determine a domain to which a resource identified by a case belongs (e.g., a domain in which the potential security issue occurs) and combine the case with other waiting cases that have a similar description and belong to the same domain (e.g., the "XYZ Domain").

In various examples, the graphical user interface 400 can be configured to present an option for the security analyst to provide feedback indicating whether an individual case is similar to other cases it is grouped with. For example, upon a cursory review of the displayed information and/or a deeper investigation, a security analyst can provide an indication, via a selection of the thumbs-up option or a selection of the thumbs-down option, of whether the similarity determination module 118 correctly grouped the case with the other cases. Acquiring this feedback enables a supervised learning approach that can improve the model 124 using labels that continue to be collected over time.

Figure 5:
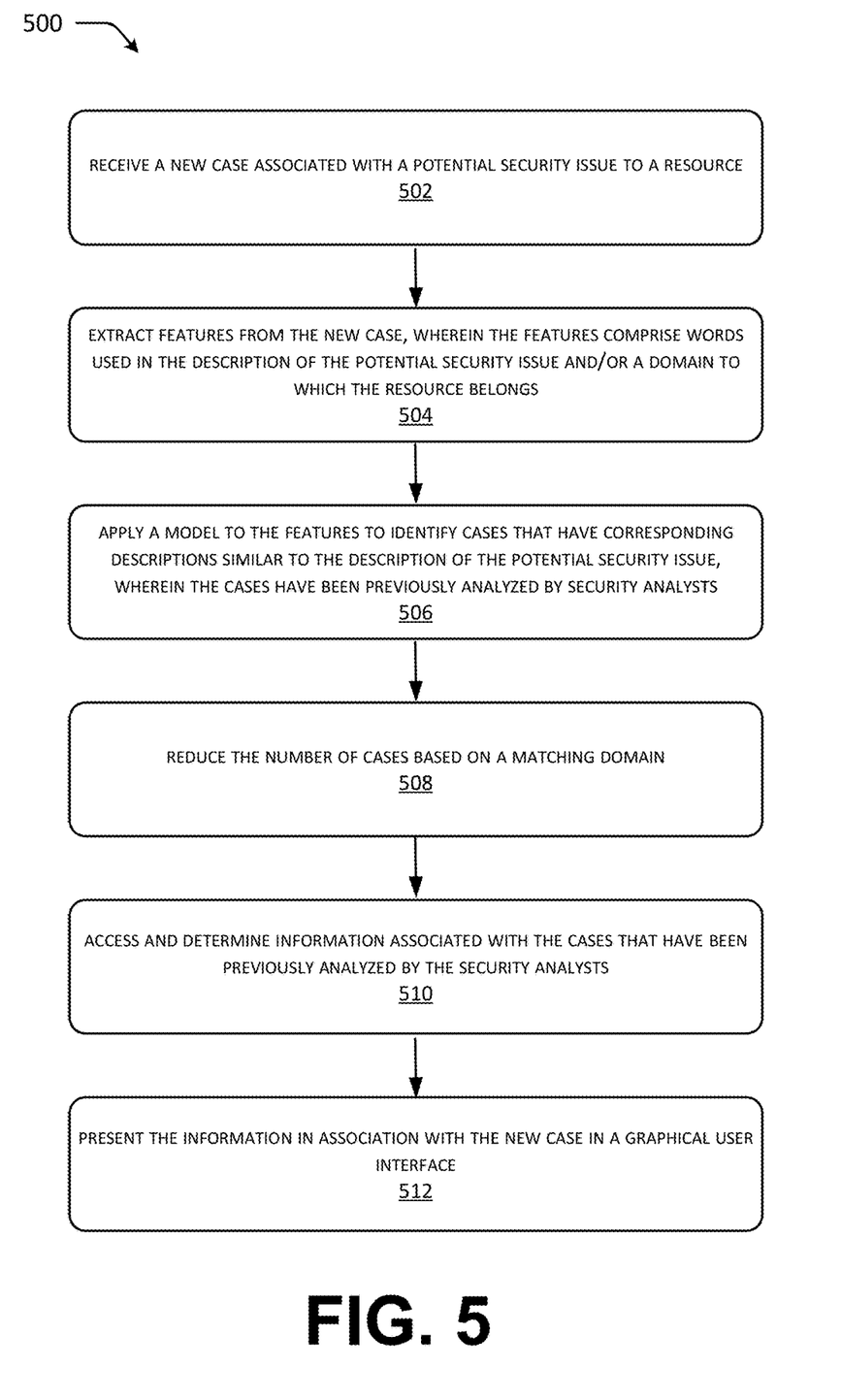
FIG. 5 is a flow diagram of an example method for identifying previously analyzed cases that are similar to a new case and using information associated with the identified previously analyzed cases to provide context for the new case to a security analyst.
Figure 6:
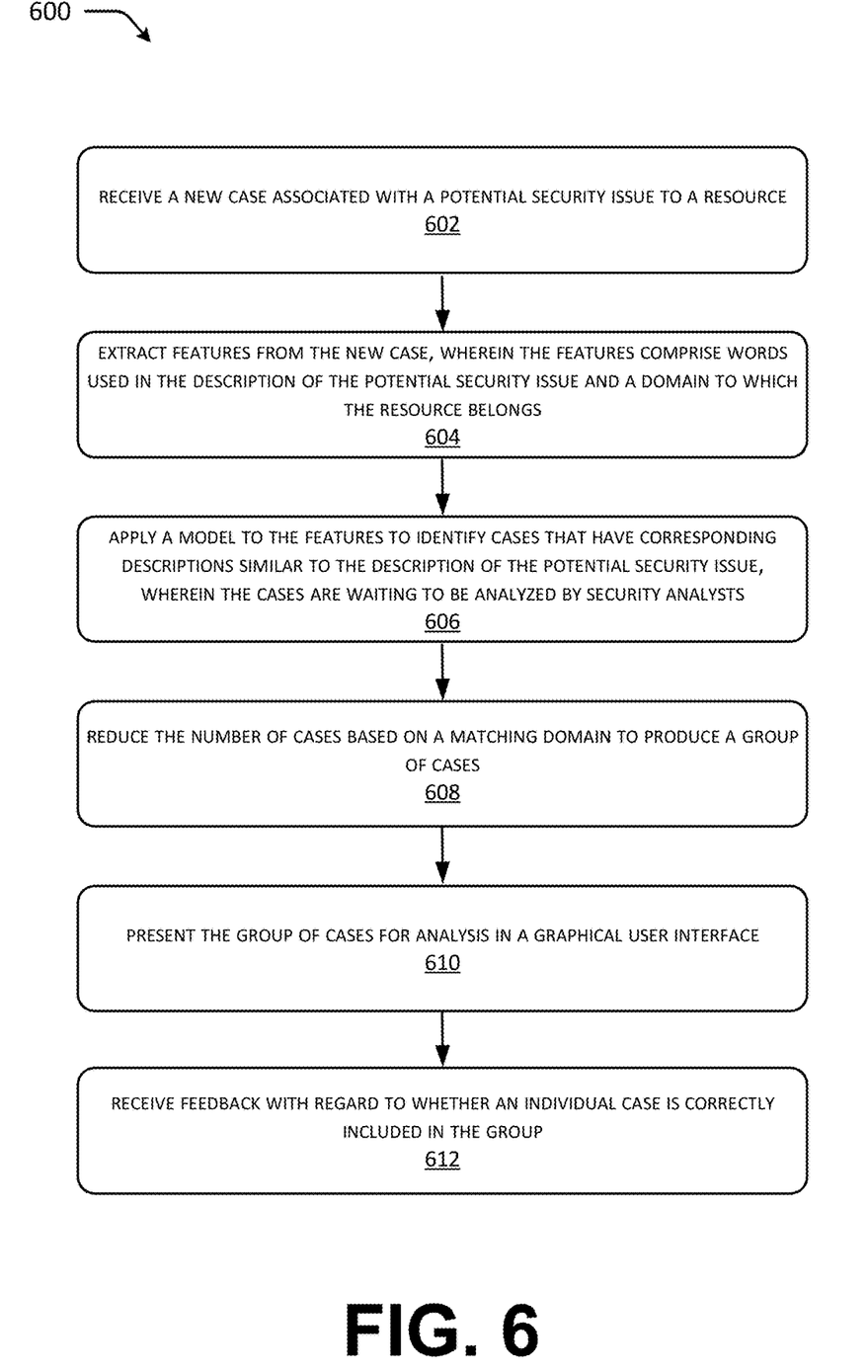
FIG. 6 is a flow diagram of an example method for identifying queued cases that are similar to a new case and grouping the new case with the identified queued cases to provide context for the new case to a security analyst.

FIGS. 5 and 6 represent example processes in accordance with various examples from the description of FIGS. 1-4. The example operations shown in FIGS. 5 and 6 can be implemented on or otherwise embodied in one or more device(s) of the security system 102.

The order in which the operations are described is not intended to be construed as a limitation, and any number of the described operations can be combined in any order and/or in parallel to implement each process. Moreover, the operations in FIGS. 5 and 6 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 5 is a flow diagram of an example method 500 for identifying previously analyzed cases that are similar to a new case and using information associated with the identified previously analyzed cases to provide context for the new case to a security analyst.

At operation 502, a new case associated with a potential security issue to a resource is received by the security system.

At operation 504, features are extracted from the new case. As described above, the features include words used in the description of the potential security issue and/or a domain to which the resource belongs.

At operation 506, a model is applied to the features to identify cases that have corresponding descriptions similar to the description of the potential security issue associated with the new case. The identified cases are cases that have been previously analyzed by a security analyst.

In various examples, at operation 508, the number of identified cases may be reduced based on matching domain information. This can help ensure that information used to provide context for the new case is limited to cases and/or potential security issues that occur in the same domain.

At operation 510, information associated with the identified cases that have previously been analyzed by the security analysts is accessed and/or determined. As described above, this can include a true positive rate, a mitigation rate, a severity level, actions previously performed to mitigate or resolve the security issue, etc.

At operation 512, the information is presented in association with the new case via a graphical user interface.

FIG. 6 is a flow diagram of an example method 600 for identifying queued cases that are similar to a new case and grouping the new case with the identified queued cases to provide context for the new case to a security analyst.

At operation 602, a new case associated with a potential security issue to a resource is received by the security system.

At operation 604, features are extracted from the new case. As described above, the features include words used in the description of the potential security issue and/or a domain to which the resource belongs.

At operation 606, a model is applied to the features to identify cases that have corresponding descriptions similar to the description of the potential security issue associated with the new case. These cases are cases that are queued and waiting to be analyzed by a security analyst.

At operation 608, the number of identified cases may be reduced based on matching domain information to produce a group of cases.

At operation 610, the group of cases is presented via a graphical user interface for analysis by a security analyst.

At operation 612, feedback with regard to whether an individual case is correctly included in the group is received. In this way, supervised learning can continue to train the model.

Figure 7:
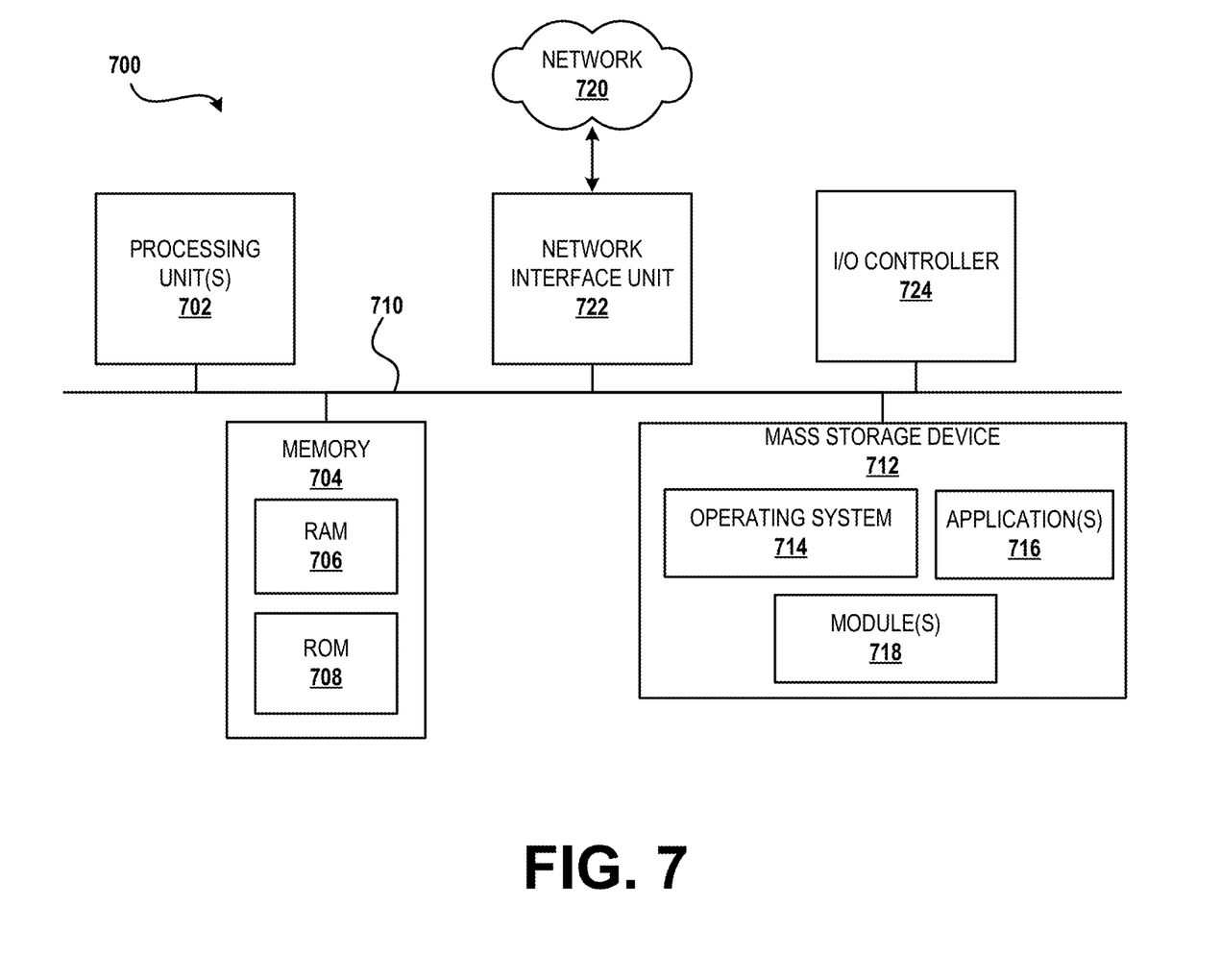
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the security system 102, capable of executing computer instructions (e.g., a module or a program component described herein). The computer architecture 700 illustrated in FIG. 7 includes processing unit(s) 702, a system memory 704, including a random access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718 (e.g., the similarity determination module 118 and the output module 120), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

The disclosure presented herein also encompasses the subject matter set forth in the following clauses.

Example Clause A, a system comprising: one or more processing units; and a computer-readable storage medium having computer-executable instructions stored thereupon, which, when executed by the one or more processing units, cause the one or more processing units to: receive a new case associated with a potential security issue to a resource, wherein the new case includes a description of the potential security issue; extract features from the new case, wherein the features comprise words used in the description of the potential security issue; apply a model to the features extracted from the new case to identify cases that have corresponding descriptions similar to the description of the potential security issue, wherein the cases have been previously analyzed by one or more security analysts; determine information associated with the cases that have been previously analyzed by the one or more security analysts; and present the information in association with the new case in a graphical user interface.

Example Clause B, the system of Example Clause A, wherein the information comprises a mitigation rate.

Example Clause C, the system of Example Clause A or Example Clause B, wherein the information comprises a true positive rate.

Example Clause D, the system of any one of Example Clauses A through C, wherein the information comprises actions taken to mitigate the cases.

Example Clause E, the system of any one of Example Clauses A through D, wherein the information comprises a severity level associated with the cases.

Example Clause F, the system of Example Clause E, wherein the graphical user interface displays a plurality of cases waiting to be analyzed in a prioritized order based on severity levels associated with the plurality of cases, wherein the new case is one of the plurality of cases.

Example Clause G, the system of any one of Example Clauses A through F, wherein the computer-executable instructions further cause the one or more processing units to: extract features from a training data set that includes a plurality of previously analyzed cases; and learn the model using the features extracted from the training data set.

Example Clause H, the system of any one of Example Clauses A through G, wherein the model is trained to map the words used in the description of the potential security issue to a linguistic context.

Example Clause I, a system comprising: one or more processing units; and a computer-readable storage medium having computer-executable instructions stored thereupon, which, when executed by the one or more processing units, cause the one or more processing units to: receive a new case associated with a potential security issue to a resource, wherein the new case includes a description of the potential security issue; extract features from the new case, wherein the features comprise words used in the description of the potential security issue; apply a model to the features extracted from the new case to identify one or more cases that have corresponding descriptions similar to the description of the potential security issue, wherein the one or more cases are waiting to be analyzed by one or more security analysts; and present the new case and the one or more cases together as a group of cases for analysis in a graphical user interface.

Example Clause J, the system of Example Clause I, wherein the computer-executable instructions further cause the one or more processing units to: determine that a domain associated with the new case is a same domain associated with the one or more cases; and group the new case with the one or more cases based at least in part on determining that the domain associated with the new case is the same domain associated with the one or more cases.

Example Clause K, the system of Example Clause J, wherein the domain comprises a particular network, a particular service, a particular platform, or a particular organization.

Example Clause L, the system of any one of Example Clauses I through K, wherein the graphical user interface presents an option to provide feedback indicating whether an individual case in the group of cases is directed to a different security issue.

Example Clause M, the system of any one of Example Clauses I through L, wherein the computer-executable instructions further cause the one or more processing units to: extract features from a training data set that includes a plurality of previously analyzed cases; and learn the model using the features extracted from the training data set.

Example Clause N, the system of any one of Example Clauses I through M, wherein the model is trained to map the words used in the description of the potential security issue to a linguistic context.

Example Clause O, a method comprising: extracting, by one or more processing units, features from a description of a potential security issue associated with a new case; applying a model to the features extracted from the description of the potential security issue to identify cases that have corresponding descriptions similar to the description of the potential security issue, wherein the cases have been previously analyzed by one or more security analysts; determining information associated with the cases that have been previously analyzed by the one or more security analysts; and presenting the information in association with the new case in a graphical user interface.

Example Clause P, the method of Example Clause O, wherein the information comprises a mitigation rate.

Example Clause Q, the method of Example Clause O or Example Clause P, further comprising using a nearest neighbor algorithm to determine a true positive rate to include in the information.

Example Clause R, the method of any one of Example Clauses O through Q, wherein the model is trained to map words used in the description of the potential security issue to a linguistic context.

Example Clause S, the method of any one of Example Clauses O through R, wherein the information comprises a severity level associated with the cases.

Example Clause T, the method of Example Clause S, wherein the graphical user interface displays a plurality of cases waiting to be analyzed in a prioritized order based on severity levels associated with the plurality of cases, wherein the new case is one of the plurality of cases.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resources, two different cases, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A system comprising:
one or more processing units; and
a computer-readable storage medium having computer-executable instructions stored thereupon, which, when executed by the one or more processing units, cause the one or more processing units to:
receive a new case associated with a potential security issue to a resource, wherein the new case includes a description of the potential security issue;
extract features from the new case, wherein the features comprise words used in the description of the potential security issue;

apply a model to the features extracted from the new case to identify cases that have corresponding descriptions similar to the description of the potential security issue, wherein the cases have been previously analyzed by one or more security analysts;

determine information associated with the cases that have been previously analyzed by the one or more security analysts, wherein the information comprises a mitigation rate and a true positive rate; and present a graphical user interface that associates the information with the new case, wherein the graphical user interface lists a plurality of new cases for review and the graphical user interface does not include the cases that have been previously analyzed by the one or more security analysts.

2. The system of claim 1, wherein the information further comprises actions taken to mitigate the cases.

3. The system of claim 1, wherein the information further comprises a severity level associated with the cases.

4. The system of claim 3, wherein the graphical user interface displays the plurality of new cases for review in a prioritized order based on severity levels associated with the plurality of new cases.

5. The system of claim 1, wherein the computer-executable instructions further cause the one or more processing units to:

extract features from a training data set that includes a plurality of previously analyzed cases; and learn the model using the features extracted from the training data set.

6. The system of claim 1, wherein the model is trained to map the words used in the description of the potential security issue to a linguistic context.

7. A method comprising:

extracting, by one or more processing units, features from a description of a potential security issue associated with a new case;

applying a model to the features extracted from the description of the potential security issue to identify cases that have corresponding descriptions similar to the description of the potential security issue, wherein the cases have been previously analyzed by one or more security analysts;

determining information associated with the cases that have been previously analyzed by the one or more security analysts, wherein the information comprises a mitigation rate and a true positive rate; and presenting a graphical user interface that associates the information with the new case, wherein the graphical user interface lists a plurality of new cases for review and the graphical user interface does not include the cases that have been previously analyzed by the one or more security analysts.

8. The method of claim 7, further comprising using a nearest neighbor algorithm to determine the true positive rate to include in the information.

9. The method of claim 7, wherein the model is trained to map words used in the description of the potential security issue to a linguistic context.

10. The method of claim 7, wherein the information further comprises a severity level associated with the cases.

11. The method of claim 10, wherein the graphical user interface displays the plurality of new cases for review in a prioritized order based on severity levels associated with the plurality of cases.

12. The method of claim 7, wherein the information further comprises actions taken to mitigate the cases.

13. One or more computer storage media comprising instructions that, when executed by one or more processing units, configure a system to perform operations comprising:

extracting features from a description of a potential security issue associated with a new case;

applying a model to the features extracted from the description of the potential security issue to identify cases that have corresponding descriptions similar to the description of the potential security issue, wherein the cases have been previously analyzed by one or more security analysts;

determining information associated with the cases that have been previously analyzed by the one or more security analysts, wherein the information comprises a mitigation rate and a true positive rate; and presenting a graphical user interface that associates the information with the new case, wherein the graphical user interface lists a plurality of new cases for review and the graphical user interface does not include the cases that have been previously analyzed by the one or more security analysts.

14. The one or more computer storage media of claim 13, wherein the operations further comprise using a nearest neighbor algorithm to determine the true positive rate to include in the information.

15. The one or more computer storage media of claim 13, wherein the model is trained to map words used in the description of the potential security issue to a linguistic context.

16. The one or more computer storage media of claim 13, wherein the information further comprises a severity level associated with the cases.

17. The one or more computer storage media of claim 13, wherein the information further comprises actions taken to mitigate the cases.

18. The one or more computer storage media of claim 17, wherein the graphical user interface displays the plurality of new cases for review in a prioritized order based on severity levels associated with the plurality of cases.

\* \* \* \* \*